US009250782B1

(12) United States Patent
Hsu

(10) Patent No.: US 9,250,782 B1
(45) Date of Patent: *Feb. 2, 2016

(54) USING SPLIT WINDOWS FOR CROSS-PLATFORM DOCUMENT VIEWS

(71) Applicant: hopTo Inc., Campbell, CA (US)

(72) Inventor: CK Hsu, San Jose, CA (US)

(73) Assignee: HOPTO INC., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/831,782

(22) Filed: Mar. 15, 2013

(51) Int. Cl.
G06F 3/0481 (2013.01)
G06F 3/0485 (2013.01)

(52) U.S. Cl.
CPC .................................... G06F 3/0485 (2013.01)

(58) Field of Classification Search
CPC .................................................... G06F 3/0481
See application file for complete search history.

(56) References Cited

U.S. PATENT DOCUMENTS

| 5,745,115 | A | * | 4/1998 | Purple et al. .................. 715/810 |
| 5,831,609 | A | | 11/1998 | London et al. |
| 6,421,070 | B1 | | 7/2002 | Ramos et al. |
| 6,636,242 | B2 | * | 10/2003 | Bowman-Amuah .......... 715/764 |
| 6,710,786 | B1 | | 3/2004 | Jacobs et al. |
| 6,758,394 | B2 | | 7/2004 | Maskatiya et al. |
| 7,039,875 | B2 | | 5/2006 | Khalfay et al. |
| 7,185,069 | B2 | | 2/2007 | Costin et al. |
| 7,210,099 | B2 | * | 4/2007 | Rohrabaugh et al. ......... 715/249 |
| 7,325,027 | B2 | * | 1/2008 | Grow et al. .................... 709/201 |
| 7,418,472 | B2 | | 8/2008 | Shoemaker et al. |
| 7,472,157 | B2 | * | 12/2008 | Tolson et al. .................. 709/202 |
| 7,631,328 | B2 | | 12/2009 | Clancy et al. |
| 7,667,704 | B2 | | 2/2010 | Hogle |
| 7,844,889 | B2 | * | 11/2010 | Rohrabaugh et al. ......... 715/200 |
| 7,877,703 | B1 | | 1/2011 | Fleming |
| 8,073,954 | B1 | | 12/2011 | Tu et al. |
| 8,108,830 | B2 | | 1/2012 | Bibr et al. |
| 8,583,627 | B1 | | 11/2013 | Kamvar et al. |
| 8,763,054 | B1 | | 6/2014 | Eilam |
| 8,763,055 | B1 | | 6/2014 | Eilam |

(Continued)

FOREIGN PATENT DOCUMENTS

WO WO 00/30729 6/2000
WO WO 2004/059938 7/2004

OTHER PUBLICATIONS

U.S. Appl. No. 13/341,207, filed Dec. 30, 2011, Eldad Eilam, Automatic Adjustment for Cross-Platform Display.

(Continued)

Primary Examiner — Phenuel Salomon
(74) Attorney, Agent, or Firm — Lewis Roca Rothgerber LLP

(57) ABSTRACT

A request is sent from a client device to a host device hosting an application capable of providing a split window view of content. Generation of a split window associated with execution of the application on the host device may include at least two split windows. Information regarding the split windows may be sent from the host device to the client device over the communication network. The client device may then use information regarding a first split window to generate an image display corresponding to the first split window. In addition, the client device may process the information regarding a second split window to stitch an image display corresponding to the second split window to the image display corresponding to the first split window. As such, upon scrolling of the display of the client device, the image display corresponding to the second split window may be displayed.

13 Claims, 3 Drawing Sheets

(56) References Cited

U.S. PATENT DOCUMENTS

| | | |
|---|---|---|
| 8,775,545 B1 | 7/2014 | Eilam |
| 8,776,152 B1 | 7/2014 | Eilam |
| 8,856,262 B1 | 10/2014 | Eilam |
| 8,990,363 B1 | 3/2015 | Currey |
| 9,106,612 B1 | 8/2015 | Currey |
| 9,124,562 B1 | 9/2015 | Currey |
| 2002/0103906 A1 | 8/2002 | Knight et al. |
| 2002/0196378 A1 | 12/2002 | Slobodin et al. |
| 2003/0053091 A1 | 3/2003 | Tanaka et al. |
| 2003/0058286 A1 | 3/2003 | Dando |
| 2003/0069923 A1 | 4/2003 | Peart |
| 2003/0182628 A1 | 9/2003 | Lira |
| 2003/0208529 A1 | 11/2003 | Pendyala et al. |
| 2004/0024899 A1 | 2/2004 | Sturrock et al. |
| 2004/0177155 A1 | 9/2004 | Enokida et al. |
| 2004/0205715 A1 | 10/2004 | Taylor |
| 2004/0267813 A1 | 12/2004 | Rivers-Moore et al. |
| 2005/0080915 A1 | 4/2005 | Shoemaker et al. |
| 2005/0198100 A1 | 9/2005 | Goring et al. |
| 2005/0235214 A1 | 10/2005 | Shimizu et al. |
| 2005/0240873 A1 | 10/2005 | Czerwinski et al. |
| 2006/0002315 A1 | 1/2006 | Theurer et al. |
| 2006/0020904 A1* | 1/2006 | Aaltonen et al. ............... 715/850 |
| 2006/0055701 A1 | 3/2006 | Taylor et al. |
| 2006/0082581 A1 | 4/2006 | Schmieder et al. |
| 2006/0082582 A1 | 4/2006 | Schmieder et al. |
| 2006/0082583 A1 | 4/2006 | Leichtling et al. |
| 2006/0085550 A1 | 4/2006 | Schmieder et al. |
| 2006/0087512 A1 | 4/2006 | Schmieder et al. |
| 2006/0149810 A1 | 7/2006 | Koo et al. |
| 2006/0184982 A1 | 8/2006 | Paz et al. |
| 2006/0195523 A1 | 8/2006 | Juang et al. |
| 2006/0225037 A1 | 10/2006 | Glein et al. |
| 2006/0227141 A1 | 10/2006 | Hogle |
| 2006/0274302 A1 | 12/2006 | Shylanski et al. |
| 2007/0005693 A1 | 1/2007 | Sampath et al. |
| 2007/0016651 A1 | 1/2007 | Blagsvedt et al. |
| 2007/0124536 A1 | 5/2007 | Carper |
| 2007/0153319 A1 | 7/2007 | Moon et al. |
| 2007/0162854 A1 | 7/2007 | Kikinis |
| 2007/0220419 A1 | 9/2007 | Stibel et al. |
| 2007/0229524 A1 | 10/2007 | Hendrey et al. |
| 2008/0009344 A1 | 1/2008 | Graham et al. |
| 2008/0016155 A1 | 1/2008 | Khalatian |
| 2008/0034320 A1 | 2/2008 | Ben-Shachar et al. |
| 2008/0082604 A1 | 4/2008 | Mansour et al. |
| 2008/0098291 A1 | 4/2008 | Bradley et al. |
| 2008/0307047 A1 | 12/2008 | Jowett et al. |
| 2008/0320396 A1 | 12/2008 | Mizrachi et al. |
| 2009/0044103 A1 | 2/2009 | Chalecki et al. |
| 2009/0100483 A1 | 4/2009 | McDowell |
| 2009/0125838 A1* | 5/2009 | Bhogal et al. ................. 715/788 |
| 2009/0157657 A1 | 6/2009 | Kim et al. |
| 2009/0228779 A1 | 9/2009 | Williamson et al. |
| 2009/0271501 A1 | 10/2009 | Shenfield et al. |
| 2009/0292999 A1 | 11/2009 | LaBine et al. |
| 2009/0320073 A1 | 12/2009 | Reisman |
| 2010/0005396 A1 | 1/2010 | Nason et al. |
| 2010/0111410 A1 | 5/2010 | Lu et al. |
| 2010/0118039 A1 | 5/2010 | Labour |
| 2010/0138809 A1 | 6/2010 | Shenfield et al. |
| 2010/0162126 A1 | 6/2010 | Donaldson et al. |
| 2010/0174974 A1 | 7/2010 | Brisebois et al. |
| 2010/0279678 A1 | 11/2010 | Li et al. |
| 2010/0281402 A1 | 11/2010 | Staikos et al. |
| 2011/0032328 A1 | 2/2011 | Raveendran et al. |
| 2011/0040826 A1 | 2/2011 | Chadzelek et al. |
| 2011/0041092 A1 | 2/2011 | Zhang |
| 2011/0078532 A1 | 3/2011 | Vonog et al. |
| 2011/0078621 A1 | 3/2011 | Kanda |
| 2011/0085016 A1* | 4/2011 | Kristiansen et al. ....... 348/14.03 |
| 2011/0099494 A1 | 4/2011 | Yan et al. |
| 2011/0113089 A1 | 5/2011 | Pryadarashan et al. |
| 2011/0213855 A1* | 9/2011 | King ............................ 709/217 |
| 2011/0219331 A1 | 9/2011 | DeLuca et al. |
| 2011/0231782 A1* | 9/2011 | Rohrabaugh et al. ......... 715/760 |
| 2011/0239142 A1 | 9/2011 | Steeves et al. |
| 2011/0252299 A1 | 10/2011 | Lloyd et al. |
| 2011/0283304 A1 | 11/2011 | Roberts et al. |
| 2011/0299785 A1* | 12/2011 | Albu et al. .................... 382/209 |
| 2012/0005691 A1 | 1/2012 | Wong et al. |
| 2012/0042275 A1 | 2/2012 | Neerudu et al. |
| 2012/0062576 A1 | 3/2012 | Rosenthal et al. |
| 2012/0075346 A1 | 3/2012 | Malladi et al. |
| 2012/0079043 A1 | 3/2012 | Brown et al. |
| 2012/0084456 A1 | 4/2012 | Vonog et al. |
| 2012/0093231 A1 | 4/2012 | Nozawa |
| 2012/0102549 A1 | 4/2012 | Mazzaferri et al. |
| 2012/0114233 A1 | 5/2012 | Gunatilake |
| 2012/0117145 A1 | 5/2012 | Clift et al. |
| 2012/0124497 A1* | 5/2012 | Kasoju et al. ................. 715/764 |
| 2012/0166967 A1 | 6/2012 | Deimbacher et al. |
| 2012/0169610 A1* | 7/2012 | Berkes et al. ................. 345/173 |
| 2012/0192078 A1* | 7/2012 | Bai et al. ....................... 715/740 |
| 2012/0214552 A1* | 8/2012 | Sirpal et al. ................... 455/566 |
| 2012/0223884 A1 | 9/2012 | Bi et al. |
| 2012/0254453 A1 | 10/2012 | Lejeune et al. |
| 2012/0266068 A1 | 10/2012 | Ryman et al. |
| 2012/0266079 A1 | 10/2012 | Lee et al. |
| 2012/0299968 A1 | 11/2012 | Wong et al. |
| 2012/0317295 A1 | 12/2012 | Baird et al. |
| 2013/0019263 A1* | 1/2013 | Ferren et al. .................... 725/37 |
| 2013/0055102 A1 | 2/2013 | Matthews et al. |
| 2013/0124609 A1 | 5/2013 | Martinez et al. |
| 2013/0194374 A1 | 8/2013 | Kieft et al. |
| 2013/0215129 A1 | 8/2013 | Keslin |
| 2013/0229548 A1 | 9/2013 | Masuko |
| 2014/0082511 A1 | 3/2014 | Weissberg et al. |
| 2014/0223314 A1 | 8/2014 | Pinto et al. |

OTHER PUBLICATIONS

U.S. Appl. No. 13/341,432, filed Dec. 30, 2011, Eldad Eilam, Cloud Based Automatic Adjustment for Cross-Platform Display.
U.S. Appl. No. 13/341,215, filed Dec. 30, 2011, Eldad Eilam, Managing Text for Cross-Platform Display.
U.S. Appl. No. 13/341,750, filed Dec. 30, 2011, Eldad Eilam, Cloud-based Text Management for Cross-Platform Display.
U.S. Appl. No. 13/341,222, filed Dec. 30, 2011, Eldad Eilam, Change Detection for Cross-Platform Display.
U.S. Appl. No. 13/341,754, filed Dec. 30, 2011, Eldad Eilam, Cloud Based Change Detection for Cross-Platform Display.
U.S. Appl. No. 13/341,227, filed Dec. 30, 2011, Eldad Eilam, Motion Vectors for Cross-Platform Display.
U.S. Appl. No. 13/341,756, filed Dec. 30, 2011, Eldad Eilam, Cloud-Based Motion Vectors for Cross-Platform Display.
U.S. Appl. No. 13/341,232, filed Dec. 30, 2011, Eldad Eilam, Client Side Detection of Motion Vectors for Cross-Platform Display.
U.S. Appl. No. 13/341,238, filed Dec. 30, 2011, Eldad Eilam, Image Hosting for Cross-Platform Display Over a Communication Network.
U.S. Appl. No. 13/341,760, filed Dec. 30, 2011, Eldad Eilam, Cloud-Based Image Hosting.
U.S. Appl. No. 13/341,425, filed Dec. 30, 2011, Eldad Eilam, Client Rendering.
U.S. Appl. No. 13/341,765, filed Jun. 6, 2012, Eldad Eilam, Cloud-Based Client Rendering.
U.S. Appl. No. 13/490,327, filed Jun. 6, 2012, Eldad Eilam, User Interface Management for Cross-Platform Display.
U.S. Appl. No. 13/490,329, filed Jun. 6, 2012, Eldad Eilam, User Interface Management for Cross-Platform Display.
U.S. Appl. No. 13/490,330, filed May 18, 2012, Eldad Eilam, Cloud-Based User Interface Management for Cross-Platform Display.
U.S. Appl. No. 13/475,911, Eldad Eilam, Facilitating Responsive Scrolling for Cross-Platform Display.
U.S. Appl. No. 13/475,912, filed May 18, 2012, Eldad Eilam, Facilitating Responsive Scrolling for Cross-Platform Display.
U.S. Appl. No. 13/475,913, filed May 18, 2012, Eldad Eilam, Cloud-Based Facilitation of Responsive Scrolling for Cross-Platform Display.

(56) References Cited

OTHER PUBLICATIONS

U.S. Appl. No. 13/475,916, filed May 18, 2012, Robert W. Currey, Decomposition and Recomposition for Cross-Platform Display.
U.S. Appl. No. 13/475,917, filed May 18,2012, Robert W. Currey, Decomposition and Recomposition for Cross-Platform Display.
U.S. Appl. No. 13/475,918, filed May 18, 2012, Robert W. Currey, Cloud-Based Decomposition and Recomposition for Cross-Platform Display.
U.S. Appl. No. 13/668,091, filed Nov. 2, 2012, Eldad Eilam, Cross-Platform Video Display.
U.S. Appl. No. 13/670,163, filed Nov. 6, 2012, Eldad Eilam, Cross-Platform Video Display.
U.S. Appl. No. 13/668,095, filed Nov. 2, 2012, Eldad Eilam, Cloud-Based Cross- Platform Video Display Nov. 2, 2012.
U.S. Appl. No. 13/831,783, filed Mar. 15, 2013, CK Hsu, Using Split Windows for Cross-Platform Document Views.
U.S. Appl. No. 13/831,786, filed Mar. 15, 2013, CK Hsu, Cloud-Based Usage of Split Windows for Cross-Platform Document Views.
U.S. Appl. No. 13/341,754, Office Action dated Jul. 31, 2013.
U.S. Appl. No. 13/341,238 Office Action dated Apr. 22, 2013.
U.S. Appl. No. 13/341,760 Office Action dated May 15, 2013.
U.S. Appl. No. 13/668,091 Office Action dated Apr. 23, 2013.
U.S. Appl. No. 13/670,163 Office Action dated May 7, 2013.
U.S. Appl. No. 13/668,095 Office Action dated Apr. 23, 2013.
Andujar, C.; Fairen, M.; Argelaguet, F., "A Cost-effective Approach for Developing Application-control GUIs for Virtual Environments," 3D User Interfaces, 2006. 3DUI 2006. IEEE Symposium on, vol., no., pp. 45,52, Mar. 25-29, 2006, doi:10.1109/VR.2006.6.
Borchers, J.; Ringel, M.; Tyler, J.; Fox, A., "Stanford interactive workspaces: a framework for physical and graphical user interface prototyping," Wireless Communications, IEEE, vol. 9, No. 6, pp. 64,69, Dec. 2002. doi: 10-1109/MWC.2002.1160083.
Boyaci, O.; Schulzrinne, Henning, "BASS Application Sharing System," Multimedia, 2008. ISM 2008. Tenth IEEE International Symposium on, vol., no., pp. 432,439, Dec. 15-17, 2008. doi:10.1109/ISM.2008.97.
Davidyuk, O., Georgantas, N., Issarny, V. & Riekki, J. (2009). MEDUSA: Middleware for End-User Composition of Ubiquitous Applications, In: Mastrogiovanni, F. & Chong, N.Y.(Eds.), Handbook of Research on Ambient Intelligence and Smart Environments: Trends and Perspectives. IGI Global, to appear. Retrieved from: http://www.mediateam.oulu.fi/public.
Fabio Paterno, Carmen Santoro, and Antonio Scorcia. 2008. Automatically adapting websites for mobile access through logical descriptions and dynamic analysis of interaction resources. In Proceedings of the working conference on Advanced visual interfaces (AVI '08). ACM, New York, NY, USA, 260-267. DOI=10.1145/1385569.1385611 http://doi.acm.org/10.
Giullo Mori, Fabio Paterno, and Carmen Santoro. 2003. Tool support for designing nomadic applications. In Proceedings of the 8th international conference on Intelligent user interfaces (IUI '03). ACM, New York, NY, USA, 141-148. DOI=10.1145/604045.604069 http://doi.acm.org/10.1145/604045.604069.
Giullo Mori, Fabio Paterno, and Carmen Santoro, "Design and development of multidevice user interfaces through multiple logical descriptions," IEEE Transactions on Software Engineering, vol. 30, No. 8, pp. 507-520, Aug. 2004. doi:10-1109/TSE.2004.40.
Huifeng Shen; Yan Lu; Feng Wu; Shipeng Li, "A high-performance remote computing platform," Pervasive Computing and Communications, 2009. PerCom 2009. IEEE International Conference on, vol., no., pp. 1,6, Mar. 9-13, 2009. doi:10.1109/PERCOM.2009.4912855.
Murielle Florins and Jean Vanderdonckt. 2004. Graceful degradation of user interfaces as a design method for multiplatform systems. In Proceedings of the 9th international conference on Intelligent user interfaces (IUI '04). ACM, New York, NY, USA, 140-147. DOI=10.1145/964442.964469 http://doi.acm.org/10.1145/964442.964469.
Nathalie Aquino, Jean Vanderonckt, and Oscar Pastor. 2010. Transformation templates: adding flexibility to model-driven engineering of user interfaces. In Proceedings of the 2010 ACM Symposium on Applied Computing (SAC '10). ACM, New York, NY, USA, 1195-1202. DOI=10.1145/1774088.1774340 http://doi.acm.org/10-1145/1774088.1774340.
Oleg Davidyuk, Ivan Sanchez, Jon Imanol Duran, and Jukka Riekki. 2008. Autonomic composition of ubiquitous multimedia applications in Reaches. In Proceedings of the 7th International Conference on Mobile and Ubiquitous Multimedia (MUM '08). ACM, New York, NY, USA. 105-108. DOI=10.1145/1543137.1543159 http://doi.acm.org/10.1145/1543137.1543159.
Xu Hu; Congfeng Jiang; Wei Zhang; Jilin Zhang; Ritai Yu; Changping Lv, "An Even Based GUI Programming Toolkit for Embedded System," Services Computing Conference (APSCC), 2010 IEEE Asia-Pacific, vol., no., pp. 625,631, Dec. 6-10, 2010. doi: 10-1109/APSCC.2010.115.
U.S. Appl. No. 13/341,207 Office Action mailed Nov. 18, 2013.
U.S. Appl. No. 13/341,754, Office Action dated Jan. 8, 2014.
U.S. Appl. No. 13/341,227 Office Action mailed Oct. 23, 2013.
U.S. Appl. No. 13/341,756 Office Action mailed Aug. 13, 2013.
U.S. Appl. No. 13/341,238 Final Office Action dated Sep. 17, 2013.
U.S. Appl. No. 13/341,760 Office Action dated Nov. 20, 2013.
U.S. Appl. No. 13/490,329 Office Action mailed Jan. 15, 2014.
U.S. Appl. No. 13/490,330 Office Action mailed Dec. 17, 2013.
U.S. Appl. No. 13/475,916 Office Action dated Nov. 13, 2013.
U.S. Appl. No. 13/475,917 Office Action dated Nov. 18, 2013.
U.S. Appl. No. 13/668,091 Final Office Action dated Nov. 6, 2013.
U.S. Appl. No. 13/670,163 Office Action dated Nov. 6, 2013.
U.S. Appl. No. 13/668,095 Office Action dated Nov. 5, 2013.
U.S. Appl. No. 13/831,783 Final Office Action dated Dec. 17, 2013.
U.S. Appl. No. 13/831,783 Office Action dated Sep. 3, 2013.
U.S. Appl. No. 13/831,783 Office Action dated Sep. 4, 2013.
U.S. Appl. No. 13/341,222, Office Action mailed Jan. 27, 2014.
U.S. Appl. No. 13/341,756 Final Office Action mailed Feb. 4, 2014.
U.S. Appl. No. 13/341,232 Office Action mailed Mar. 10, 2014.
U.S. Appl. No. 13/341,425 Office Action mailed Mar. 5, 2014.
U.S. Appl. No. 13/341,765 Office Action mailed Feb. 7, 2014.
U.S. Appl. No. 13/490,327 Office Action mailed Jan. 28, 2014.
U.S. Appl. No. 13/475,916 Final Office Action mailed Mar. 12, 2014.
U.S. Appl. No. 13/475,917 Final Office Action mailed Mar. 12, 2014.
U.S. Appl. No. 13/341,432 Office Action mailed Mar. 24, 2014.
U.S. Appl. No. 13/341,215 Office Action mailed Mar. 21, 2014.
U.S. Appl. No. 13/341,750 Office Action mailed Apr. 16, 2014.
U.S. Appl. No. 13/341,754, Office Action mailed Apr. 16, 2014.
U.S. Appl. No. 13/341,227 Final Office Action mailed Apr. 18, 2014.
U.S. Appl. No. 13/475,918 Office Action mailed Mar. 12, 2014.
U.S. Appl. No. 14/337,659, filed Jul. 22, 2014, Eldad Eilam, Cloud-Based Image Hosting.
U.S. Appl. No. 14/312,925, filed Jun. 24, 2014, Eldad Eilam, Cloud-Based Cross-Platform Video Display.
U.S. Appl. No. 13/341,425 Final Office Action mailed Aug. 29, 2014.
U.S. Appl. No. 13/490,327 Final Office Action mailed Aug. 21, 2014.
U.S. Appl. No. 13/490,329 Final Office Action mailed Aug. 11, 2014.
U.S. Appl. No. 13/475,918 Final Office Action mailed Sep. 30, 2014.
U.S. Appl. No. 13/831,783 Office Action mailed Sep. 19, 2014.
U.S. Appl. No. 13/831,786 Office Action mailed Sep. 16, 2014.
U.S. Appl. No. 13/831,786 Final Office Action mailed Dec. 17, 2013.
U.S. Appl. No. 13/831,786 Office Action mailed Sep. 4, 2013.
U.S. Appl. No. 13/341,432 Final Office Action mailed Nov. 19, 2014.
U.S. Appl. No. 13/341,215 Final Office Action mailed Dec. 12, 2014.
U.S. Appl. No. 13/341,227 Office Action mailed Dec. 29, 2014.
U.S. Appl. No. 13/341,756 Final Office Action mailed Oct. 22, 2014.
Ali, Mir Farooq, et al., "Building multi-platform user interfaces with UIML." Computer-Aided Design of User Interfaces III. Springer Netherlands, 2002. 255-266.
Cuergo, "Ergonomic Guidelines for arranging a Computer Workstation—10 steps for users", Jun. 6, 2004. p. 1-5.
Holzinger, Andreas, Peter Treitler, and Wolfgang Slany. "Making apps useable on multiple different mobile platforms: On interoperability for business application development on smartphones." Multidisciplinary Research and Practice for Information Systems. Springer Berlin Heidelberg, 2012. 176-189.
Karch, Marziah, "Android in a Microsoft World." Android for Work. Apress, 2010. 93-102.
U.S. Appl. No. 13/341,207 Final Office Action mailed May 14, 2014.

(56) References Cited

OTHER PUBLICATIONS

U.S. Appl. No. 13/341,222, Final Office Action mailed May 15, 2014.
U.S. Appl. No. 13/341,756 Office Action mailed Jun. 11, 2014.
U.S. Appl. No. 13/341,232 Final Office Action mailed Jun. 18, 2014.
U.S. Appl. No. 13/341,765 Final Office Action mailed Jun. 24, 2014.
U.S. Appl. No. 13/490,330 Final Office Action mailed Jul. 17, 2014.
U.S. Appl. No. 13/475,911 Office Action mailed Jun. 24, 2014.
U.S. Appl. No. 13/475,912 Office Action mailed Jun. 24, 2014.
U.S. Appl. No. 13/475,913 Office Action mailed Jun. 24, 2014.
U.S. Appl. No. 13/341,207 Office Action mailed Jan. 27, 2015.
U.S. Appl. No. 13/341,750 Final Office Action mailed Jan. 30, 2015.
U.S. Appl. No. 13/341,222, Office Action mailed Jan. 29, 2015.
U.S. Appl. No. 13/341,754, Final Office Action mailed Jan. 9, 2015.
U.S. Appl. No. 13/341,232 Office Action mailed Feb. 6, 2015.
U.S. Appl. No. 13/341,765 Office Action mailed Mar. 16, 2015.
U.S. Appl. No. 13/490,330 Office Action mailed Mar. 11, 2015.
U.S. Appl. No. 13/475,911 Final Office Action mailed Mar. 10, 2015.
U.S. Appl. No. 13/475,912 Final Office Action mailed Mar. 10, 2015.
U.S. Appl. No. 13/475,913 Final Office Action mailed Jun. 24, 2014.
U.S. Appl. No. 13/341,432 Office Action mailed Mar. 27, 2015.
U.S. Appl. No. 13/341,754, Final Office Action mailed Jan. 13, 2015.
U.S. Appl. No. 13/341,756 Office Action mailed Mar. 27, 2015.
U.S. Appl. No. 13/475,913 Final Office Action mailed Mar. 10, 2015.
U.S. Appl. No. 14/312,925 Office Action mailed Mar. 25, 2015.
U.S. Appl. No. 13/341,215 Office Action mailed Apr. 17, 2015.
U.S. Appl. No. 14/337,659 Office Action mailed Mar. 31, 2015.
U.S. Appl. No. 13/341,425 Office Action mailed Apr. 10, 2015.
U.S. Appl. No. 13/490,327 Office Action mailed Apr. 13, 2015.
U.S. Appl. No. 13/490,329 Office Action mailed Apr. 3, 2015.
U.S. Appl. No. 13/831,786 Final Office Action mailed Apr. 9, 2015.
U.S. Appl. No. 13/341,222, Office Action mailed Jun. 26, 2015.
U.S. Appl. No. 14/841,152, filed Aug. 31, 2015, Robert W. Currey, Cloud-Based Decomposition and Recomposition for Cross-Platform Display.
U.S. Appl. No. 13/341,207 Final Office Action mailed Jul. 28, 2015.
U.S. Appl. No. 13/341,750 Office Action mailed Jul. 22, 2015.
U.S. Appl. No. 13/341,754, Office Action mailed Aug. 19, 2015.
U.S. Appl. No. 13/341,227 Final Office Action mailed Aug. 13, 2015.
U.S. Appl. No. 13/475,911 Office Action mailed Oct. 22, 2015.
U.S. Appl. No. 14/312,925 Final Office Action mailed Oct. 29, 2015.
US 8,689,268, 04/2014, Eilam (withdrawn)

* cited by examiner

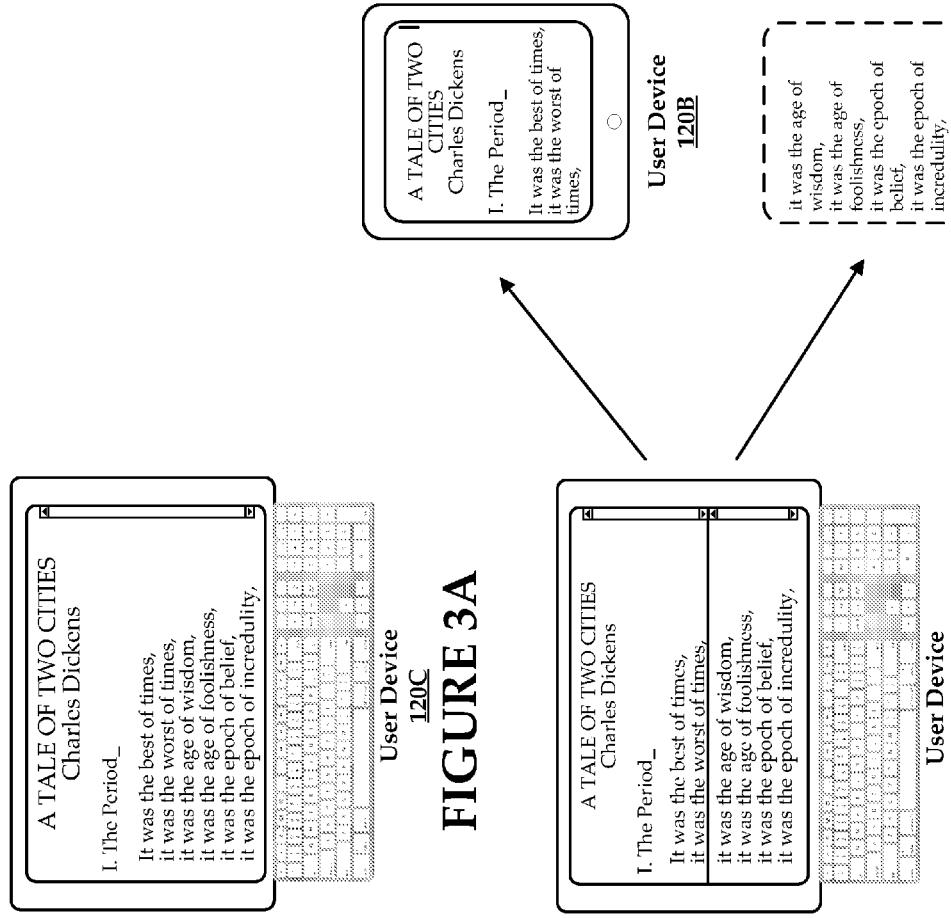

USING SPLIT WINDOWS FOR CROSS-PLATFORM DOCUMENT VIEWS

BACKGROUND

1. Field of the Invention

The present invention generally relates to cross-platform display. More specifically, the present invention relates to using split windows for cross-platform document views.

2. Description of the Related Art

Individuals currently have a variety of options for communicating and carrying out transactions. Such options may include traditional desktop coming devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunk, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers).

Some conventional techniques for transmitting images may include sending information regarding a first image and commands (e.g., vectors) regarding any changes to that image. Such techniques may not be appropriate or work well with certain types of content. Content that may exhibit a large number of changes, however, may be difficult to convey as vectors. For example, video may include a number of images that may undergo a series of continual and quick changes. As such, techniques that rely on transmitting drawing commands as vectors may not be able to keep up with the pace of certain videos.

There is, therefore, a need in the art for improved systems and methods for using split windows for cross-platform document views.

SUMMARY OF THE CLAIMED INVENTION

Embodiments of the present invention include systems and methods for using split windows for cross-platform document views. A request is sent from a client device to a host device hosting an application capable of providing a split window view of content. Generation of a split window associated with execution of the application on the host device may include at least two split windows. Information regarding the split windows may be sent from the host device to the client device over the communication network. The client device may then use information regarding a first split window to generate an image display corresponding to the first split window. In addition, the client device may process the information regarding a second split window to stitch an image display corresponding to the second split window to the image display corresponding to the first split window. As such, upon scrolling of the display of the client device, the image display corresponding to the second split window may be displayed.

Various embodiments of the present invention include methods for using split windows for cross-platform document views. Such methods may include sending a request concerning application display information from a client device to a host device hosting an application capable of providing a split window view of content, receiving information sent from the host device including display information regarding at least two split windows generated by the application on the host device, generating an image display on the client device corresponding to a first split window of the at least two split windows, and stitching an image display corresponding to a second split window to the image display corresponding to the first split window. As such, the image display corresponding to the second split window is viewable upon scrolling on the client device.

Embodiments of the present invention may further include systems for using split windows for cross-platform document views. Such systems may include a host device and a client device requesting information from a host device executing an application capable of providing a split window view of content. The host device may provide data including information regarding a display of the host device. Such display information may concern at least two split windows. The client device may use the received data to generate an image display corresponding to a first split window. In addition, the client device may stitch an image display corresponding to a second window to the image display corresponding to the first split window, such that scrolling on the client device results in views of the image display corresponding to the second window.

Other embodiments of the present invention include non-transitory computer-readable storage media on which is embodied instructions executable to perform a method for using split windows for cross-platform document views as previously set forth above.

BRIEF DESCRIPTION OF THE DRAWINGS

FIG. 3A is an illustration of an exemplary host device executing an application providing a view of content.

FIG. 3B is an illustration of an exemplary host device executing an application providing a split window view of content.

FIG. 3C is an illustration of an exemplary client device with an image display corresponding to a first split window view and background processing of an image display corresponding to a second split window view.

FIG. 3D is an illustration of the exemplary client device of FIG. 3C following scrolling.

DETAILED DESCRIPTION

Systems and methods for using split windows for cross-platform document views are provided. A request is sent from a client device to a host device hosting an application capable of providing a split window view of content. Generation of a split window associated with execution of the application on the host device may include at least two split windows. Information regarding the split windows may be sent from the host device to the client device over the communication network. The client device may then use information regarding a first split window to generate an image display corresponding to the first split window. In addition, the client device may process the information regarding a second split window to stitch an image display corresponding to the second split window to the image display corresponding to the first split window. As such, upon scrolling of the display of the client device, the image display corresponding to the second split window may be displayed.

Figure 1:
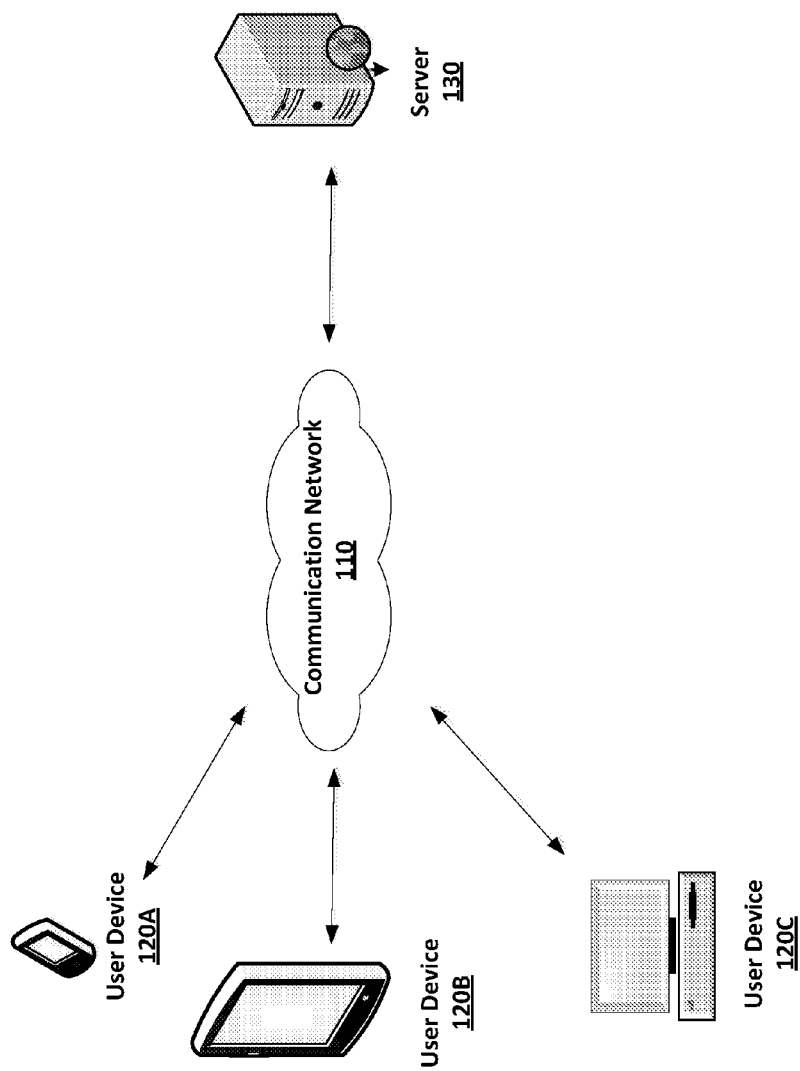
FIG. 1 illustrates a network environment in which an exemplary system for using split windows for cross-platform document views may be implemented.

FIG. 1 illustrates a network environment 100 in which a system for cross-platform video display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic user devices 120A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage (memory), and processors for executing instructions that may be stored in memory.

User device 120A is illustrated as a mobile phone or smartphone, while user device 120B is illustrated as a tablet computing device and client device 120C is illustrated as a desktop device. As can be seen, each user device 120 is sized differently and/or has different input options. Exemplary embodiments of the present invention allow for tasks and applications that are specific to one user device 120 (e.g., operating in a Microsoft Windows® environment) to be used and optimized for another user device 120 (e.g., operating in an Apple iOS® environment).

Each user device 120 may act as a host device interacting with a client device; likewise, each user device 120 may act as the client device in communication with a host. A user device 120 may further include a client application, a client 3D library, and a client display driver. Collectively, these elements may enable the user device and the user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as user device 120C. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
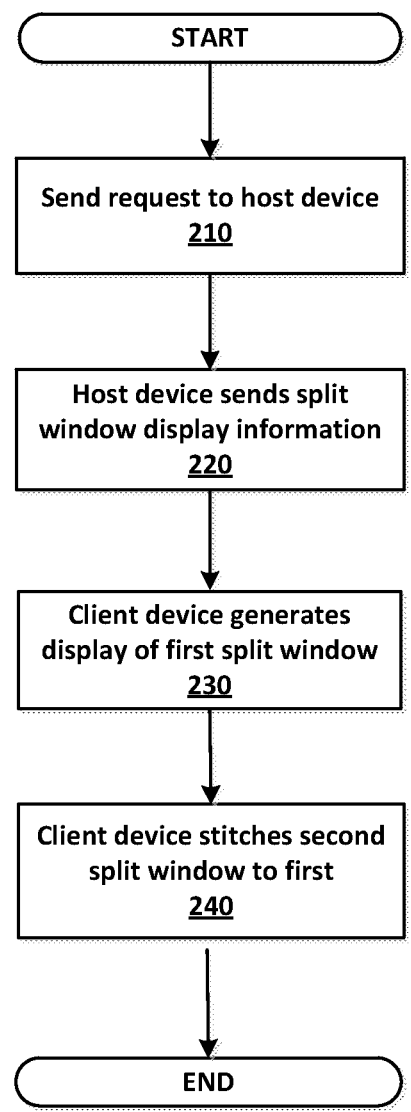
FIG. 2 is a flowchart illustrating an exemplary method for using split windows for cross-platform document views.

FIG. 2 illustrates a method 200 for using split windows for cross-platform video display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a request may be sent from a client device concerning application display information to a host device hosting an application capable of providing a split window view of content. Executing the application on the host device may provide information regarding a split window view of content, which may be sent from the host device to the client device. The client device may generate an image display that corresponds to a first split window of the at least two split windows. In addition, the client device may also process the information regarding a second split window in order to stitch an image display corresponding to the second split window to the image display corresponding to the first split window. As such, when a user of the client device scrolls down, the image display corresponding to the second split window appears to be a seamless part of the client device display.

In step 210, a request initiated at a requesting client device (e.g., user device 120B) is sent to a host device. The host device may be another user device 120 (e.g., user device 120C) and may host various types of data and resources, any of which may be subject of the request sent by the requesting client device 120B. For example, a client device 120B may request access to certain host data or may request that a task be performed by host device 120C (and/or host device applications). The request may specifically concern information regarding the display of the host device 120C associated with execution of a certain application. For example, where the client device 120B requests that an application open a document (or other content), the display may include a window presenting at least a portion of the requested document. FIG. 3A is an illustration of an exemplary host device 120C executing an application providing a view of content.

In instances where the request concerns access to a content using a particular application, step 220 includes executing the application on the host device 120C and generating a display of the requested content on host device 120C. FIG. 3B is an illustration of the exemplary host device 120C executing an application providing a split window view of content. Such a display may include a split window view of the requested content where the application is capable of providing tools for displaying and manipulating portions of the same content via split windows. Such tools may rely on any capabilities already present within an application or apply similar tools as known in the art for splitting views of content (e.g., Microsoft Word® provides split window view of a document). Such split-window views of content are generally used to provide different views of the same content. Users may use such split windows, for example, to view and manipulate different parts of a large content file. For example, one split window may display one particular page, while another split window may display another page of a multi-page document. Information regarding the plurality of split windows may be sent from host device 120C to client device 120B.

In step 230, the client device 120B receives the display information from the host device 120B and uses information regarding a first split window to generate a display image on the client device 120B display that corresponds to the first split window. As a result, the client device 120B provides a display of the requested content that corresponds to the display of the first split window of the host device 120C. FIG. 3C is an illustration of an exemplary client device 120B displaying an image corresponding to the first split window view of host device 120C. In addition, the client device 120B may receive information regarding the second split window, and background processing of an image display corresponding to a second split window view may occur. Various adjustments of the client device 120B display may be possible, including re-centering, adjusting text size, and other display adjustments known in the art.

In step 240, the client device 120B processes information regarding a second split window to stitch a display image corresponding to the second split window to the display image corresponding to the first split window. Such image stitching may be implemented using tools and techniques known in the art for processing images. Such processing may occur in the background while the client device 120B is displaying the display image corresponding to the first split window. A user of client device 120B may, for example, view or manipulate the content corresponding to that appearing in the first split window of host device 120C. When the user scrolls (or otherwise requests) to view the next portion of the content, the image display corresponding to the second split window may appear seamlessly connected to the image display corresponding to the first split window. FIG. 3D is an illustration of the exemplary client device 120B of FIG. 3C following scrolling. In FIG. 3D, the display of client device 120B shows a view of the content in which the image display corresponding to the first split window has been stitched to the image display corresponding to the second split window. As a result, the client device 120B allows the user to scroll seamlessly through content accessed from host device 120C.

While the illustration of FIGS. 3B-3D involves two split windows, more split windows may be involved. For example, while a client device 120B may be displaying the image display of the first split window, background processing and stitching of the image display of the second split window may be completed. In some instances, the second split window of host device 120C may automatically scroll to a next portion of the content and begin sending information regarding the display information corresponding to that next portion to client device 120B. As such, an image display corresponding that next portion may be stitched to the preceding image display in order to provide for seamless scrolling through the additional next portion on client device 120B. Such background communication and processing may repeat until image displays have been stitched together to form a cohesive image display corresponding to the entire content file (or a predetermined segment thereof).

Various embodiments of the present invention allow for the method 200 to be performed by an intermediary device (e.g., server 130) which may be associated with the host device or reside elsewhere in the network (e.g., in the cloud). For example, server 130 may receive the request from a requesting client device 120B, forward to a host client device 120C, receive responsive data from host client device 120C, use the responsive data to generate the display instructions for client device 120B display, which may then be sent to client device 120B, along with display information. Upon execution, the client device 120B may generate an image display that corresponds to the first split window display on the host device 120C and stitches multiple image displays corresponding to other split window displays, which allows for seamless scrolling on the client device 120B.

Alternatively, the method 200 may be performed by software downloaded to a user device 120B. For example, software located at either requesting client device 120B or host device 120C may provide a request initiated at the requesting client device 120B to host client device 120C, receive display data responsive to the request as provided by host client device 120C, use the responsive display data to generate the instructions for client device 120B display, which may then be sent or otherwise provided to client device 120B for execution.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for using split windows for cross-platform document views, the method comprising:
    sending a request concerning application display information from a client device having a single display screen to a host device having a single display screen, wherein the host device is hosting an application capable of providing a split window view of a single content file, wherein the host device executes the application to generate on the single display screen of the host device the split window view comprising at least two split windows, and wherein each split window of the host device independently providing a view of a portion of the same content file;
    receiving information sent over the communication network from the host device, the information including display information regarding the at least two split windows generated by the application on the host device, wherein the received information regarding a first split window comprises an image of a first portion of the content file in a view provided by the first split window on the host device, and wherein the received information regarding a second split window comprises a plurality of images pertaining to a plurality of different portions of the same content file;
    generating an image on the single display screen on the client device, wherein the client device single display screen provides a single screen view corresponding to the first split window of the at least two split windows of the host device; and
    processing the display information regarding the second split window of the at least two split windows of the host device, wherein an image corresponding to the second split window is stitched to the image display corresponding to the first split window and wherein the image display corresponding to the second split window is not viewable until a scrolling action is received on the single display screen of the client device.

2. The method of claim 1, wherein the first split window and the second split window of the host device display different parts of the same content file.

3. The method of claim 1, wherein the received information comprises a plurality of images.

4. The method of claim 1, wherein the received information regarding the first split window comprises an image of a first portion of the content file in a view provided by the first split window on the host device.

5. The method of claim 1, further comprising continuing to receive the plurality of images corresponding to the second split window and processing in the background the received plurality of images, wherein the processed plurality of images are not immediately displayed at the client device.

6. The method of claim 1, wherein a first image of the plurality of images corresponds to a portion immediately subsequent to a portion displayed in the first split window, and wherein a next image of the plurality of images corresponds to a next immediately subsequent portion.

7. An apparatus for using split windows for cross-platform document views, the apparatus comprising:
    a communication interface that:
        sends a request concerning application display information from a client device having a single display screen to a host device having a single display screen, wherein the host device is hosting an application capable of providing a split window view of a single content file, wherein the host device executes the application to generate on a single display screen of the host device the split window view comprising at least two split windows, and wherein each split window of the host device independently providing a view of a portion of the same content file, and
        receives information sent over the communication network from the host device, the information including display information regarding the at least two split windows generated by the application on the host device, wherein the received information regarding a first split window comprises an image of a first portion of the content file in a view provided by the first split window on the host device, and wherein the received information regarding a second split window comprises a plurality of images pertaining to a plurality of different portions of the same content file;
    the single display screen of the client device that displays an image, wherein the client device single display screen provides a single screen view corresponding to the first split window of the at least two split windows;
    a processor of the client device that executes instructions stored in memory, wherein execution of the instructions by the processor processes the display information regarding the second split window of the at least two split windows, wherein an image corresponding to the second split window is stitched to the image display corresponding to the first split window, and a user interface of the client device that allows for scrolling of the display of the single display screen of the client device, wherein the image display corresponding to the second split window is not viewable until a scrolling action is received.

8. The apparatus of claim 7, wherein the first split window and the second split window of the host device display different parts of the same content file.

9. The apparatus of claim 7, wherein the received information comprises a plurality of images.

10. The apparatus of claim 7, wherein the plurality of images corresponding to the second split window are captured as the host device scrolls through the view provided by the second split window.

11. The apparatus of claim 7, further comprising continuing to receive the plurality of images corresponding to the second split window and processing in the background the received plurality of images, wherein the processed plurality of images are not immediately displayed at the client device.

12. The apparatus of claim 7, wherein a first image of the plurality of images corresponds to a portion immediately subsequent to a portion displayed in the first split window, and wherein a next image of the plurality of images corresponds to a next immediately subsequent portion.

13. A non-transitory computer-readable storage medium, having embodied thereon a program executable by a processor to perform a method for using split windows for cross-platform document views, the method comprising:

sending a request concerning application display information to a host device, wherein the host device is hosting an application capable of providing a split window view of a single content file, wherein the host device executes the application to generate on a single display screen of the host device the split window view comprising at least two split windows, and wherein each split window of the host device independently providing a view of a portion of the same content file;

receiving information from the host device, the information including display information regarding the at least two split windows generated by the application on the host device, wherein the received information regarding a first split window comprises an image of a first portion of the content file in a view provided by the first split window on the host device, and wherein the received information regarding a second split window comprises a plurality of images pertaining to a plurality of different portions of the same content file;

generating an image on a single display screen, wherein the single display screen provides a single screen view corresponding to the first split window of the at least two split windows; and processing the display information regarding the second split window of the at least two split windows, wherein an image corresponding to the second split window is stitched to the image display corresponding to the first split window and wherein the image on the single display screen corresponding to the second split window is not viewable until a scrolling action is received.

* * * * *